United States Patent
Saeidi et al.

(10) Patent No.: US 9,652,005 B2
(45) Date of Patent: May 16, 2017

(54) THERMAL SOLUTION FOR WEARABLE DEVICES BY USING WRIST BAND AS HEAT SINK

(71) Applicant: QUALCOMM Incorporated, San Diego, CA (US)

(72) Inventors: Mehdi Saeidi, San Diego, CA (US); Emil Rahim, San Diego, CA (US); Rajat Mittal, San Diego, CA (US); Arpit Mittal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/849,842

(22) Filed: Sep. 10, 2015

(65) Prior Publication Data
US 2017/0017279 A1    Jan. 19, 2017

Related U.S. Application Data (60) Provisional application No. 62/191,792, filed on Jul. 13, 2015.

(51) Int. Cl.
*G06F 1/20*    (2006.01)
*G04B 37/14*    (2006.01)
*G04G 17/00*    (2013.01)

(52) U.S. Cl.
CPC ......... *G06F 1/206* (2013.01); *G04B 37/1486* (2013.01); *G04G 17/00* (2013.01); *G06F 1/203* (2013.01)

(58) Field of Classification Search
CPC ....... H01L 2924/00; H01L 2224/32225; H01L 2224/48227; H01L 2224/73265; G06F 1/163; G06F 3/017; G06F 1/203; G06F 19/322; G06F 1/20; G06F 3/014; G06F 1/206; G06F 1/1626; G06F 2203/0331; G06F 1/1656; G06F 1/1613; G06F 1/1694; G06F 1/1684; G06F 1/1607; G04B 37/1486
See application file for complete search history.

(56) References Cited

U.S. PATENT DOCUMENTS 4,624,113 A  * 11/1986  Hull ...................... F25B 23/003
                                                    62/235.1
6,097,607 A     8/2000  Carroll et al.
6,262,889 B1    7/2001  Newman et al.
(Continued)

FOREIGN PATENT DOCUMENTS

CN          203354731 U    12/2013
DE      202014105859 U1     4/2015
GB           2351801 A      1/2001

OTHER PUBLICATIONS

International Search Report and Written Opinion—PCT/US2016/037065—ISA/EPO—Sep. 20, 2016.

*Primary Examiner* — Adam B Dravininkas
(74) *Attorney, Agent, or Firm* — Arent Fox, LLP (57) ABSTRACT

A heat transfer component of a smart watch captures at least a portion of heat emitted by one or more electronic components located within an enclosure of the smart watch. The heat transfer component transfers at least a portion of the captured heat to a wrist band outside the enclosure of the smart watch. The wrist band allows for dissipation of at least a portion of the transferred heat through at least one surface of the wrist band.

23 Claims, 5 Drawing Sheets

(56) References Cited

U.S. PATENT DOCUMENTS

| | | | |
|---|---|---|---|
| 6,304,521 B1 | 10/2001 | Kanesaka | |
| 8,992,009 B2 | 3/2015 | Austin | |
| 2002/0186535 A1 | 12/2002 | Smith et al. | |
| 2007/0106350 A1* | 5/2007 | Carstens | A41D 13/005 607/108 |
| 2008/0314429 A1* | 12/2008 | Leonov | H01L 35/30 136/201 |
| 2012/0140451 A1* | 6/2012 | Araujo | F21V 23/0492 362/103 |
| 2013/0085552 A1* | 4/2013 | Mandel | A61F 7/007 607/99 |
| 2013/0114203 A1 | 5/2013 | Ignatchenko et al. | |
| 2014/0299169 A1* | 10/2014 | Schneider | H01L 35/02 136/201 |
| 2015/0029661 A1* | 1/2015 | Huang | G06F 1/203 361/679.54 |
| 2015/0245699 A1* | 9/2015 | Nishi | F28D 20/02 224/576 |
| 2015/0350392 A1* | 12/2015 | Park | H04M 1/0202 455/575.6 |
| 2015/0359135 A1* | 12/2015 | Cavallaro | H05K 7/2039 361/679.03 |
| 2016/0049569 A1* | 2/2016 | Negrin | H01L 35/30 136/201 |
| 2016/0132081 A1* | 5/2016 | Wu | G06F 1/163 361/679.03 |
| 2016/0135328 A1* | 5/2016 | Wu | G06F 1/163 361/679.03 |

\* cited by examiner

View A-A

FIG. 5

THERMAL SOLUTION FOR WEARABLE DEVICES BY USING WRIST BAND AS HEAT SINK

CROSS-REFERENCE TO RELATED APPLICATION

This application claims the benefit of U.S. Provisional Application Ser. No. 62/191,792, entitled "THERMAL SOLUTION FOR WEARABLE DEVICES BY USING WRIST BAND AS HEAT SINK" and filed on Jul. 13, 2015, which is assigned to the assignee hereof and expressly incorporated herein by reference in its entirety.

BACKGROUND

Field

The present disclosure relates generally to thermal management of electronic devices and systems, and more particularly, to thermal management of wearable devices.

Background

Wearable devices, also known as wearable computers, are miniature electronic devices that can be worn by a person. An example of a wearable device is a smart watch, which is a computerized wristwatch with functionality that is enhanced beyond timekeeping. A smart watch may include features such as a camera, accelerometer, thermometer, altimeter, barometer, compass, chronograph, calculator, cell phone, touch screen, Global Positioning System (GPS) navigation, map display, graphical display, speaker, scheduler, watch, mass storage device, and rechargeable battery. It may communicate with a wireless headset, heads-up display, insulin pump, microphone, modem, or other devices.

Because of the increasing number of functionalities and improving computing power of wearable devices, an increased level of heat is emitted by these devices while performing functions. Therefore, improved thermal management of wearable devices is desirable.

One of the most important temperature specifications in mobile devices is skin temperature or surface temperature. The skin or surface temperature corresponds to the temperature at the outside surface of a mobile device. Temperatures at one or more surfaces of mobile devices may become too hot to touch, thus leading to uncomfortable user experience. Therefore, the skin or surface temperature needs to be low at the outer surfaces where the user is touching the device. For many typical mobile device usages, the upper limit of acceptable skin or surface temperature may be reached before electronic components, e.g., integrated circuits (IC), power sources, etc., within the mobile device reach their junction temperature. The junction temperature is the highest operating temperature of the electronic components. When the upper limit of acceptable skin or surface temperature is reached before electronic components within the mobile device reach their junction temperature, the mobile device goes to thermal mitigation in order to reduce heat emission and lower the skin or surface temperature. Thermal mitigation may include reducing clock speed or shutting down one or more electronic components of the device from time to time. Thus, the performance of the mobile device will be limited because of the thermal mitigation, while the operating temperature of the electronic components is still well below the junction temperature. This prevents the mobile device from reaching its maximum operating capabilities. The skin or surface temperature issue can be more severe in wearable devices as wearable device are smaller and directly in contact with user's body (e.g., wrist).

SUMMARY

A smart watch captures at least a portion of heat emitted by one or more electronic components located within an enclosure of the smart watch. The smart watch transfers at least a portion of the captured heat to a wrist band outside the enclosure of the smart watch. The wrist band is attached to the enclosure of the smart watch. The smart watch dissipates at least a portion of the transferred heat through at least one surface of the wrist band.

A wearable device includes at least one electronic component that emits heat during operation of the wearable device, and an accessory remote from the electronic device. A heat transfer component is configured to capture at least a portion of heat emitted by the at least one electronic component and transfer at least a portion of the captured heat to an interior of the accessory. The accessory is configured to dissipate heat from the heat transfer component, through the accessory, into ambient air surrounding the wearable device.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a thermal management mechanism for wearable device will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements").

Figure 1:
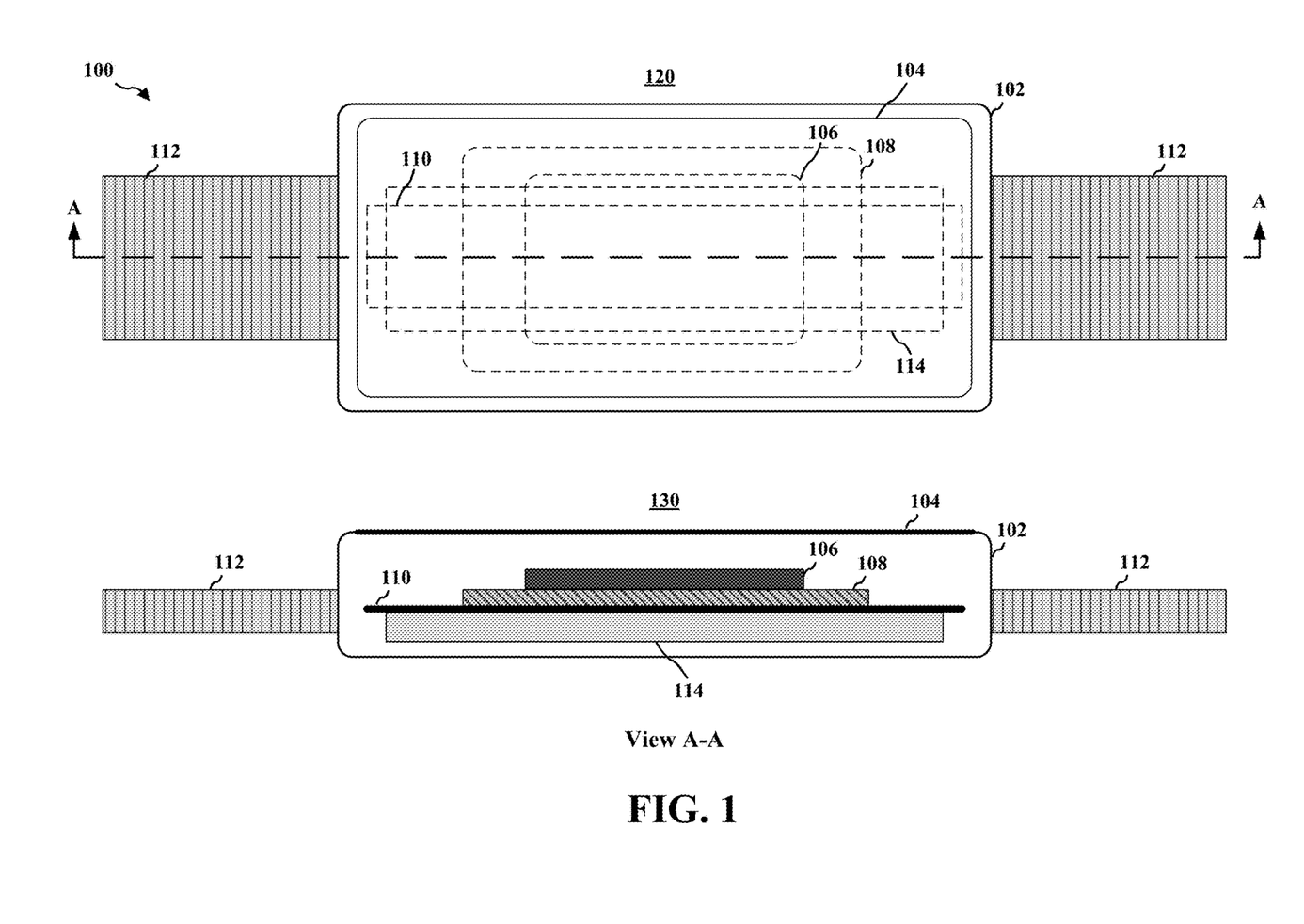
FIG. 1 is a diagram illustrating a top view of a conventional wearable device and a cross section side view of the wearable device along line A-A.

FIG. 1 is a diagram illustrating a top view 120 of a conventional wearable device 100 and a cross section side view 130 of the wearable device along line A-A. The wearable device 100 may be a smart watch. The wearable device 100 includes an enclosure 102 that encloses device components, including electronic components and heat transfer components. Electronic components may include, for example, an IC 106, a battery (not shown), a memory component (not shown), a printed circuit board (PCB) 108. Heat transfer components may include a heat spreader 110 and a heat sink 114. A surface of the enclosure 102 may contain a liquid-crystal display (LCD) 104, a portion of which extends into the enclosure.

The wearable device 100 also includes an accessory 112 attached to the enclosure 102. The accessory is located outside of the enclosure 102. In one configuration, the accessory 112 may be a wrist band. In another configuration, the accessory 112 may be eye glasses temple tips. In other configurations, the accessory 112 may be a headband, arm band, leg band, ankle band, or anything that attaches the wearable device 100 to the human body.

The heat spreader 110 is a heat exchanger that moves or distributes heat from a heat source (e.g., the IC 106) that is generating or emitting heat to the heat sink 114. The heat sink 114 functions as a secondary heat exchanger. The surface area and geometry of the heat sink 114 are larger than the heat source 106. Thus, the heat sink 114 is more efficient than the heat source 106 in dissipating heat. The heat spreader 110 distributes or transfers the heat generated or emitted by the heat source 106 to the heat sink 114, so that the heat sink 114 may be more fully utilized to dissipate heat. Even though the wearable device configured as shown in FIG. 1 includes a heat transfer mechanism, e.g., a heat spreader 110 in combination with heat sink 114, for distributing and dissipating heat more efficiently, the enclosure 102 limits the surface size of the heat sink 114. Thus, the effectiveness of the heat sink 114 in reducing the skin or surface temperature is limited. Accordingly, a more effective way of thermal management for reducing the skin or surface temperature is desirable.

Figure 2:
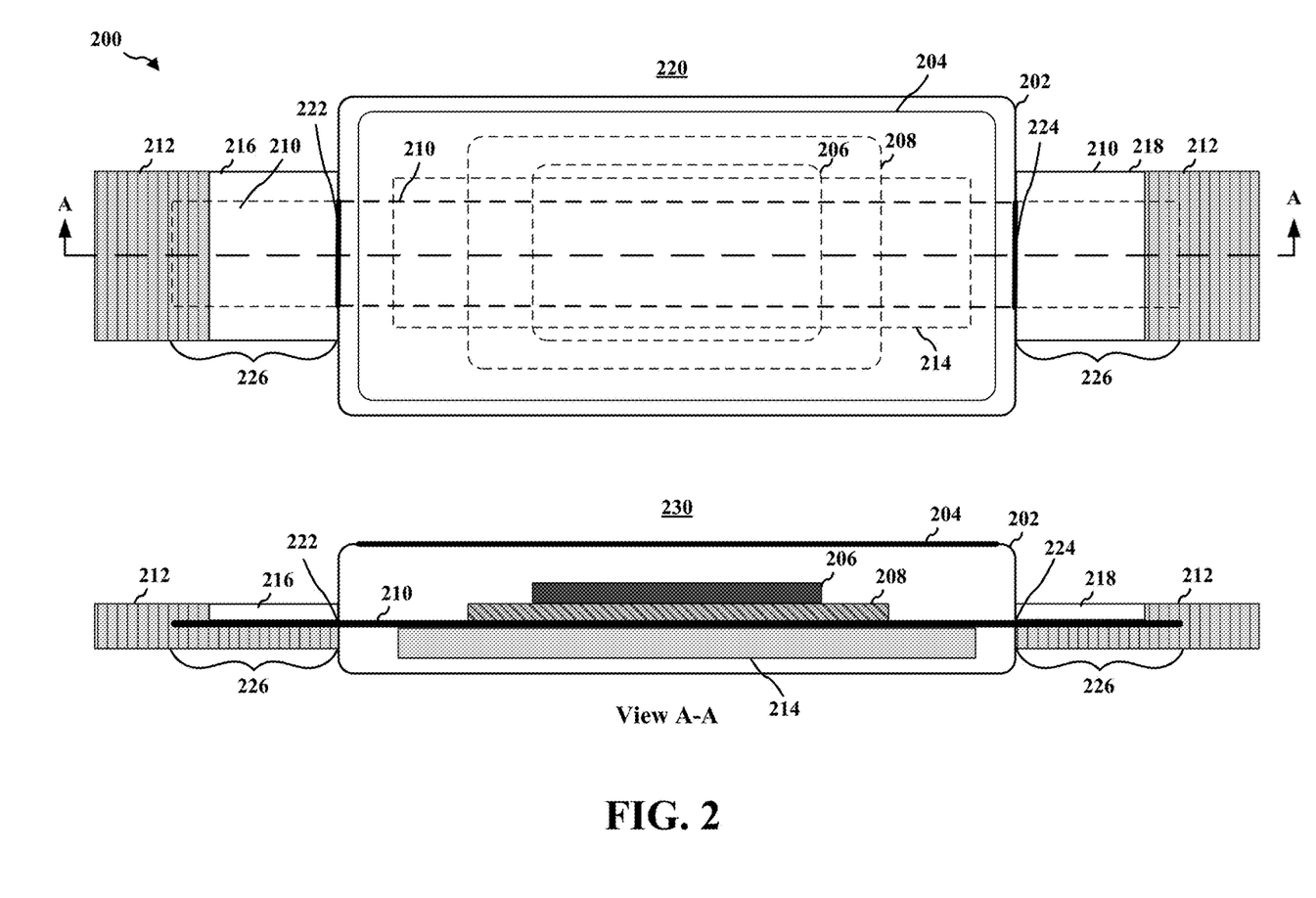
FIG. 2 is a diagram illustrating a top view of a wearable device and a cross section side view of the wearable device along line A-A, and having a mechanism for spreading heat generated by the wearable device.

FIG. 2 is a diagram illustrating a top view 220 of a wearable device 200 and a cross section side view 230 of the wearable device along line A-A. The wearable device 200 includes a mechanism for spreading heat generated by a heat source of the wearable device to regions of the wearable device remote from the heat source. In one configuration, the wearable device 200 may be a smart watch. In other configurations, the wearable device 200 may be a pair of eye glasses, a headset (e.g., virtual reality headset), or a device that can be worn on other parts of a human body. The wearable device 200 includes an enclosure 202 that encloses device components, including electronic components and heat transfer components. Electronic components may include, for example, an IC 206, a battery (not shown), a memory component (not shown), a printed circuit board (PCB) 208. Heat transfer components may include a heat spreader 210. Heat transfer components may optionally include a heat sink 214. A surface of the enclosure 202 may contain a liquid-crystal display (LCD) 204, a portion of which extends into the enclosure.

The wearable device 200 may also include an accessory 212 attached to the enclosure 202. The accessory 212 is located outside of the enclosure 202. In one configuration, the accessory 212 may be a wrist band. In another configuration, the accessory 212 may be eye glasses temple tips. In other configurations, the accessory 212 may be a headband, arm band, leg band, ankle band, or anything that attaches the wearable device 200 to the human body. The wearable device 200 may include a heat spreader 210 that extends from inside the enclosure 202, through openings 222 and 224 in the enclosure, into the accessory 212 outside the enclosure 202, and through at least a portion 226 of the accessory 212.

One or more of the electronic components, such as IC 206, may perform a set of operations/functions that cause the electronic component to emit heat. In one configuration, the electronic components emit heat even though the set of operations/functions (e.g., computation and communication) performed by the electronic components is not for the purposes of generating heat. In other words, the heat generated by the electronic components is a byproduct of the component's intended operation/function. In one configuration, the IC 206 may be a system on chip (SOC) that integrates all components of a computer or other electronic system into a single chip. In another configuration, the IC 206 may be a SiP that includes a number of chips in a single package. In yet another configuration, the IC 206 may be a PoP stacking that combines vertically discrete logic and memory ball grid array (BGA) packages. In one configuration, the IC 206 includes at least one of a central processing unit (CPU), graphics processing unit (GPU), or wireless communication chip. In one configuration, the IC 206 may be mounted on the PCB 208. In one configuration, the IC 206 may be enclosed within an electromagnetic interference (EMI) shield (not shown). The PCB 208 electrically connects electronic components using conductive tracks, pads and other features etched from copper sheets laminated onto a non-conductive substrate.

The heat spreader 210 is a heat exchanger that moves or distributes heat between a heat source (e.g., the IC 206) that is generating or emitting heat to the accessory 212. The accessory 212 functions as a secondary heat exchanger. The surface area and geometry of the accessory 212 are larger than the heat source 206. Thus, the accessory 212 is more efficient than the heat source 206 in dissipating heat. The heat spreader 210 distributes or transfers the heat generated or emitted by the IC 206 to the accessory 212 by extending through at least a portion 226 of the accessory, so that the accessory may be utilized as a heat sink to dissipate the heat. The heat spreader 210 is made of thermally conductive materials.

In one configuration, the heat spreader 210 may be a plate made of copper, which has a high thermal conductivity. In other configurations, the heat spreader 210 may be made of at least one of a sheet of copper foil, a sheet of aluminum foil, one or more thin heat pipes, or carbon fibers. The heat pipe may be long and thin. The typical thickness of a heat pipe may be 0.3 to 1 mm or higher. The length of a heat pipe can be as long as the design requires. In one configuration, the one or more heat pipes extend from the hot region (e.g., IC) to the cold region (e.g., wrist band). Copper, aluminum and graphite based heat spreaders can be much thinner than the heat spreaders made of heat pipes. In one configuration, the thickness of copper, aluminum and graphite based heat spreaders can be from 50 microns and up. In one configuration, the length and width of a heat spreader is design dependent, e.g., dependent on the dimensions of a wrist band through which the heat spreader extends. Since thickness is an important factor in designing mobile devices, designers may use very thin heat spreaders to reduce overall device thickness.

The heat spreader 210 may be embedded in the accessory 212, so that it is not in direct contact with human body/skin. The accessory 212 may be made of one or more materials, e.g., one or more types of plastics and/or metal. The thermal conductivity of plastic material is low. A typical polymer material has thermal conductivity of 0.3 W/m-K. Metal materials have high thermal conductivity. For instance, a steel based material may have thermal conductivity of 15 W/m-K or higher dependent on the alloy used. An aluminum based material may have thermal conductivity in the range of 120 W/m-K to 240 W/m-K.

In one configuration, the side of the accessory 212 that touches the skin of the user may be more thermally insulating than the side away from the skin so that heat dissipates away from the skin. For example, the side of accessory 212 that touches the skin of the user can be made of plastic/polymer based material, e.g., with thermal conductivity of 0.3 W/m-K. In one configuration, the side of accessory 212 that touches the skin of the user may be made of metal based material, but there may be a thin air gap between the IC/PCB and the metal to create thermal isolation (air thermal conductivity is very low, about 0.026 W/m-K).

The heat spreader 210 may be in direct or indirect contact with one or more surfaces inside the enclosure 202 in order to capture heat emitted by one or more electronic components within the enclosure. For example, the heat spreader 210 may contact one or more surfaces of an electronic component of the wearable device, a heat transfer component of the wearable device, and the enclosure 202 of the wearable device. Regarding electronic components, the heat spreader 210 may be in direct contact with a surface of the IC 206, a surface of the PCB 208, a surface of an EMI shield (not shown) of IC 206, a surface of a power source, e.g., battery, (not shown), or a surface of a memory component (not shown). Regarding heat transfer components, the heat spreader 210 may be in direct contact with a surface of an optional heat sink 214 that may be within the enclosure 202.

The heat spreader 210 passes through openings 222 and 224 of the enclosure and extends through at least a portion 226 of the accessory 212 in order to provide a path of thermal conductivity from within the enclosure 202 to outside the enclosure. The thermally conductive path transfers the heat emitted by electronic components, such as IC 206, to the accessory 212. The heat spreader 210 is positioned within an interior of the accessory 212 such that it is surrounded by the material forming the accessory.

The accessory 212 may be configured to dissipate the heat transferred by the heat spreader 210 into the accessory by one or both of convection and radiation. Dissipation of heat by the accessory mitigates the effect of heat emitted by the IC 206 to thereby cool down the wearable device 200 and provide for an improved user experience. Because of the larger surface area of the accessory 212 and a larger heat spreader 210 that extends outside the enclosure 202, the accessory 212 dissipates the heat more effectively than components within the enclosure 202. Therefore, the accessory 212 may act as a heat sink for the wearable device 200.

Convection is the transfer of heat from one place to another by the movement of fluids (e.g., air). In one configuration, the accessory dissipates heat by convective heat transfer between the accessory 212 and the air (i.e., heat transfer by the movement of air).

In another configuration, the accessory 212 may optionally include one or more transparent portions 216, 218 in areas that the heat spreader 210 at least partially extends through. The transparent portions 216 and 218 of the accessory 212 are made of transparent materials and provide for heat dissipation by radiation. Radiation is the transmission of heat in the form of visible light through space or through a material medium. A material medium made of transparent material helps visible light to pass through, and thus facilitates heat transfer by radiation. Because of the transparent portions 216 and 218, the heat spreader 210 is exposed to ambient air through radiation. Thus, in this configuration, in addition to heat dissipation through convective heat transfer between the accessory 212 and the air (i.e., heat transfer by the movement of air), the accessory 212 may also dissipate heat received through the heat spreader 210 through radiation and becomes more effective in heat dissipation. In one configuration, the entire accessory 212 can be made of transparent material to facilitate heat transfer by radiation.

Figure 3:
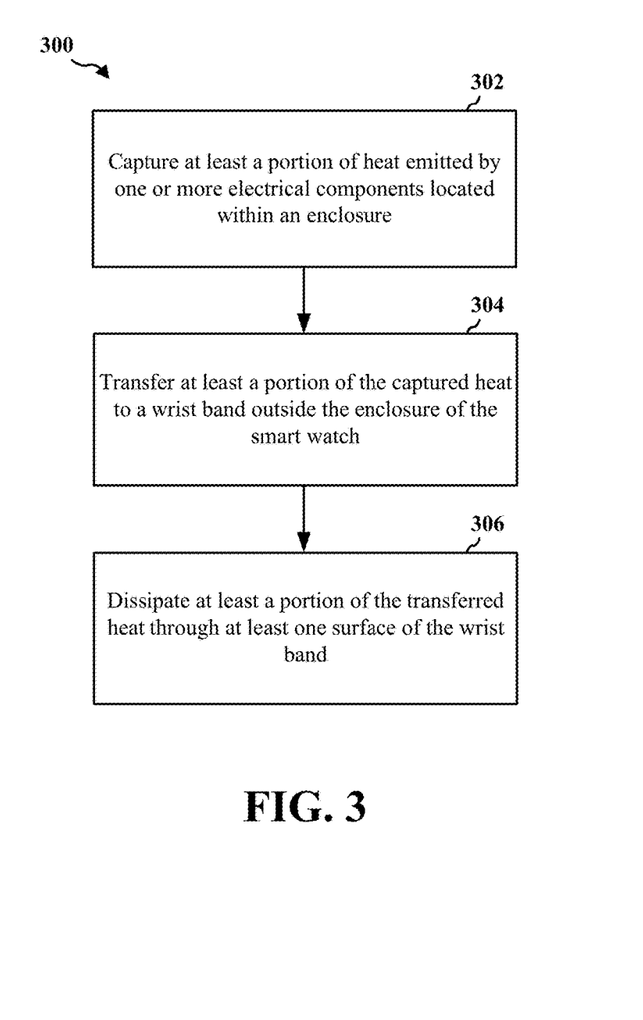
FIG. 3 is a flowchart of a method of thermal management.

FIG. 3 is a flowchart 300 of a method of thermal management. The method may be performed by a wearable device. In one configuration, the wearable device may be a smart watch. In one configuration, the method begins when the smart watch is turned on.

At 302, the smart watch captures at least a portion of heat emitted by one or more electrical components located within an enclosure of the smart watch. The heat may be captured by a thermally conductive path 210 of the smart watch that contacts one or more surfaces within the enclosure 202 of the smart watch. The one or more surfaces may be one or more of a surface of an electronic component and a surface of the enclosure. The thermally conductive path may include a thermally conductive material. For example, the thermally conductive path may include at least one of copper foil, aluminum foil, thin heat pipes, or carbon fibers. The one or more electronic components emit heat due to performing a set of operations/functions for the smart watch. In one configuration, the electronic components emit heat even though the set of operations/functions (e.g., computation and communication) performed by the electronic components is not for the purposes of generating heat. In other words, the heat generated by the electronic components is a byproduct of the component's intended operation/function.

In one configuration, the one or more electronic components may be a SOC that integrates all components of a computer or other electronic system into a single chip. In another configuration, the one or more electronic components may be a SiP that includes a number of chips in a single package. In yet another configuration, the one or more electronic components may be a PoP stacking that combines vertically discrete logic and memory BGA packages. In one configuration, the one or more electronic components include at least one of a CPU, GPU, or wireless communication chip. In one configuration, the one or more electronic components may be the IC 206 described in relation to FIG. 2 above.

At 304, the smart watch transfers at least a portion of the captured heat to a wrist band outside the enclosure of the smart watch. The wrist band is attached to the enclosure of the smart watch. The wrist band may be used to attach the smart watch to the wrist of a human body. The wrist band may be the accessory 212 described above in relation to FIG. 2. In one configuration, at least a portion of the captured heat is transferred by a thermally conductive path provided between an interior of the enclosure and an interior of the wrist band. For example, the conductive path may be provided by a heat spreader, such as the heat spreader 210 described above in relation to FIG. 2, that is coupled to (e.g., through contact) a surface within the enclosure of the smart watch and extends through at least a portion of the wrist band.

At 306, the smart watch dissipates at least a portion of the transferred heat through at least one surface of the wrist band. In one configuration, the heat is dissipated through convective heat transfer between the wrist band and the air. In another configuration, a portion of the wrist band (e.g., the transparent portions 216 and 218 described above in relation to FIG. 2) may be made of transparent materials. Therefore, in addition to convective heat transfer, the heat can also be dissipated through the transparent portions of the wrist band via radiation.

Figure 4:
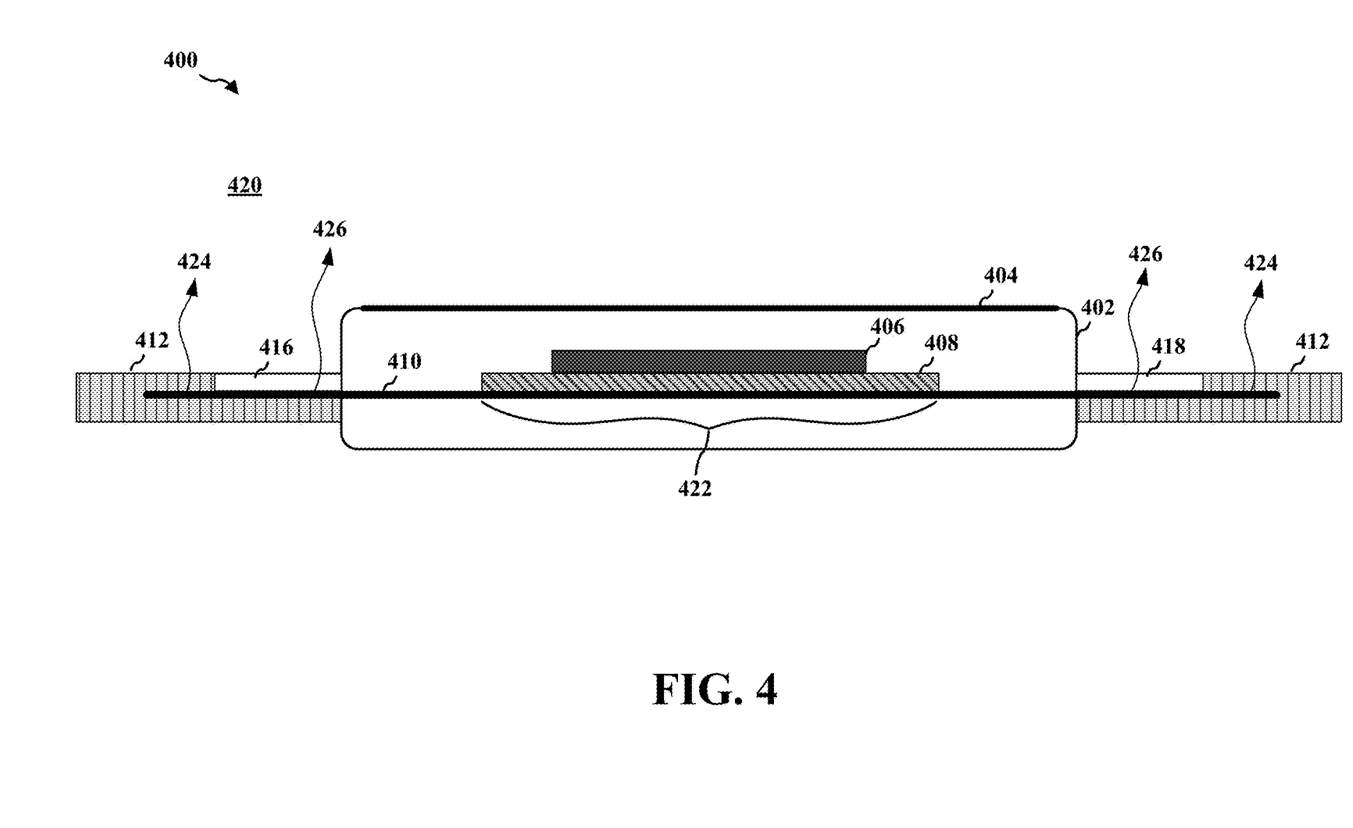
FIG. 4 is a diagram illustrating a cross section side view of a wearable device configured to implement the method of FIG. 3.

FIG. 4 is a diagram illustrating a cross section side view of a wearable device 400 configured to implement the method of FIG. 3. In one configuration, each component of the wearable device 400 performs similar functions to the corresponding component of wearable device 200 described above with reference to FIG. 2. In one configuration, the wearable device 400 is a smart watch. The wearable device 400 may include one or more electronic components 406, 408 and an enclosure 402.

The wearable device 400 may include means for capturing at least a portion of heat emitted by an electronic component 406, 408. The electronic component that emits heat may be a direct source of heat, such as an IC 406, or it may be an indirect source of heat, such as a PCB 408 that absorbs heat from other electronic components 406. The means for capturing at least a portion of emitted heat may be configured to be coupled to (e.g., through contact) one or more surfaces within the enclosure with a portion of a thermally conductive path. The thermally conductive path may be formed of a thermally conductive material. The thermally conductive path may be in the form of a copper foil, aluminum foil, thin heat pipes, or carbon fibers.

The means for capturing may be a portion 422 of a heat spreader 410 that directly or indirectly contacts one or more surfaces within the enclosure 402 to capture heat emitted by the electronic components 406, 408. In FIG. 4, the means for capturing 422 is in direct contact with a PCB 408. In other arrangements, the means for capturing may be in direct contact with the IC 406, or the enclosure 402. The means for capturing may include one or more heat spreaders 410, each of which may have a portion in contact with a different surface within the enclosure 402.

The wearable device 400 may also include means for transferring at least a portion of the captured heat to the accessory 412 outside the enclosure 402. In one configuration, the means for transferring provides a thermally conductive path between the interior of the enclosure 402 and the interior of the accessory 412. The thermally conductive path may be provided by the heat spreader 410. In FIG. 4, the means for transferring 410 includes a single heat spreader 410. In other arrangement, the means for transferring may include several heat spreaders, each providing a thermally conductive path between one or more surfaces within the enclosure 402 and the interior of the accessory 412.

The wearable device 400 may further include means for dissipating at least a portion of the transferred heat through at least one surface of the accessory 412. In one configuration, the means for dissipating comprises the accessory 412. In one configuration, the means for dissipating is configured to radiate the at least a portion of the transferred heat through at least one portion 416, 418 of the accessory 412. To this end, the portion 416, 418 of the accessory 412 is made of transparent material that allows heat 426 to radiate from the heat spreader 410 to the air 420 surrounding the device 400. In one configuration, the means for dissipating is configured to move the at least a portion of the transferred heat from the accessory 412 to air through air movement around the accessory 412. To this end, the accessory 412 may be formed of a thermally conductive material that allows heat 424 to transfer from the heat spreader 410 to the surface of the accessory 412, which then performs convective heat transfer with air 420 surrounding the device 400 to transfer heat 424 to air 420. For example, the accessory 412 may be formed of metal. The direction of heat dissipation from the accessory 412 may be controlled by material with different thermal conductivities in different parts of the accessory. In one configuration, the side of the accessory 412 that touches the skin would be more thermally insulating than the side away from the skin so that heat is dissipated in that direction.

Figure 5:
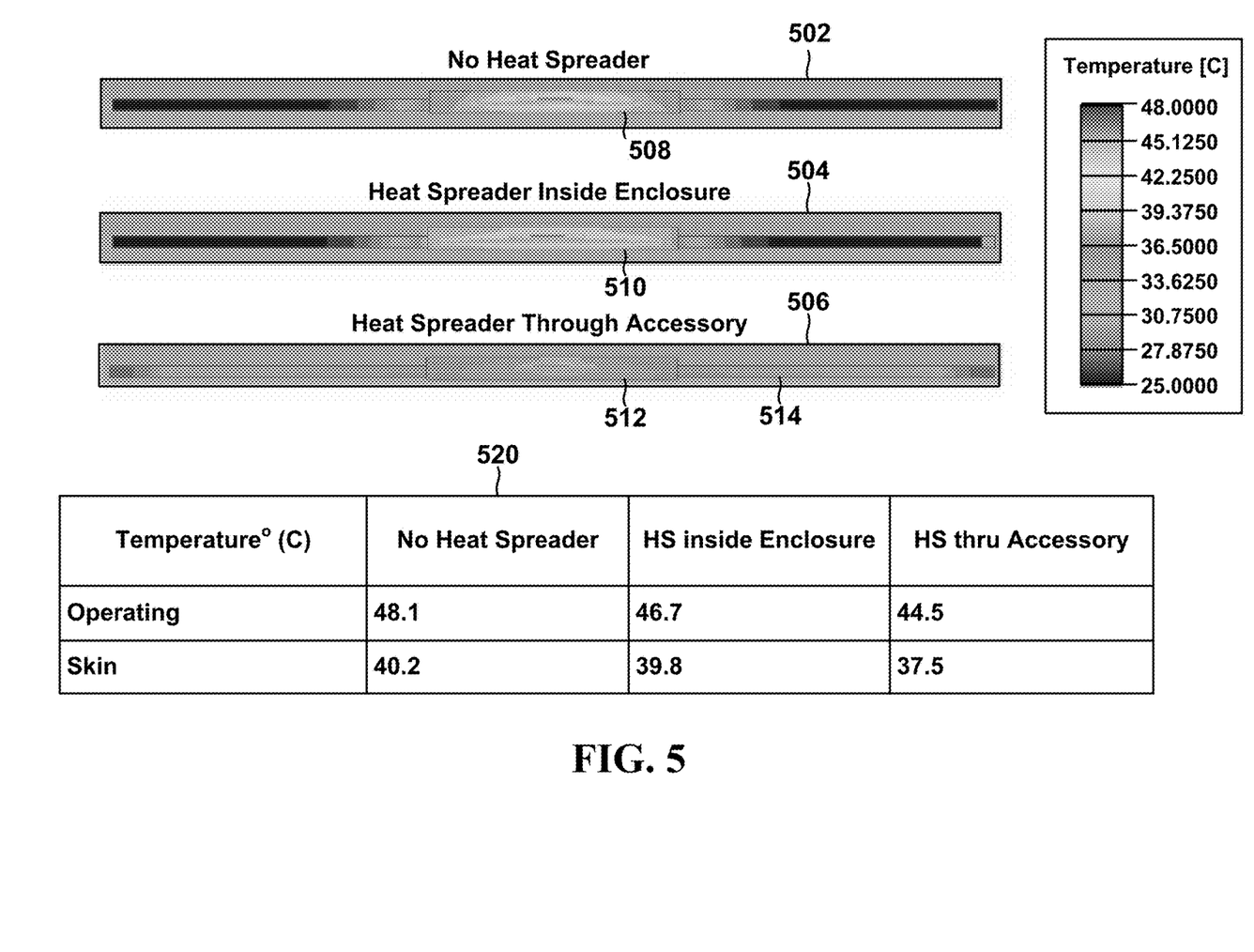
FIG. 5 are diagrams illustrating results of heat transfer for different configuration of a wearable device.

FIG. 5 includes diagrams illustrating results of heat transfer for different configuration of a wearable device. The top diagram 502 shows the thermal simulation of a wearable device that has no heat spreader. As shown, heat is concentrated within the enclosure 508 of the wearable device. The middle diagram 504 shows the thermal simulation of a wearable device that has heat spreader entirely within the enclosure 510 of the device. As shown, the heat is still concentrated within the enclosure of the wearable device, though to a lesser degree than the device in top diagram 502, where there is no heat spreader. The bottom diagram 506 shows the thermal simulation of a wearable device that has a heat spreader that extends from within the enclosure 512 of the device through an accessory 514 of the device, such as disclosed herein with reference to FIGS. 2 and 4. The accessory 514 is attached to the enclosure 512 of the device. As shown in the bottom diagram 506, heat is distributed more evenly across the accessory 514 and the enclosure 512 of the wearable device.

As shown in table 520, the operating temperature of the one or more electronic components (e.g., an IC within the enclosure) of the wearable device is 48.1° C. without the heat spreader, 46.7° C. with the heat spreader inside the enclosure, and 44.5° C. with the heat spreader extending through the accessory. The skin or surface temperature of the wearable device is 40.2° C., 39.8° C., and 37.5° C., respectively. Therefore, with the heat spreader extending through the accessory, the operating temperature of the electronic components and the skin/surface temperature of the wearable device are substantially lower than the other configurations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A wearable device, comprising:
at least one electronic component within an enclosure that emits heat during an operation of the wearable device;
an accessory attached to the enclosure; and
a heat transfer component configured to capture at least a portion of heat emitted by the at least one electronic component and transfer at least a portion of the captured heat to an interior of the accessory,
wherein the heat transfer component extends through at least a portion of the accessory,
and wherein the accessory is configured to radiate at least a portion of heat transferred by the heat transfer component through the at least a portion of the accessory, the at least a portion of the accessory configured with a first side comprising a transparent material and a second side comprising a non-transparent material.

2. The wearable device of claim 1, wherein the accessory provides for heat dissipation by convection.

3. The wearable device of claim 1, wherein the accessory is configured with the first side comprising a first thermally conductive material and the second side comprising a second thermally conductive material having a thermal conductivity less than the first thermally conductive material.

4. A smart watch, comprising:
an enclosure;
at least one electronic component within the enclosure that emits heat during operation of the smart watch;
a wrist band outside the enclosure, wherein the wrist band is attached to the enclosure; and
a heat spreader coupled to at least one surface inside the enclosure and extending through at least a portion of the wrist band, the heat spreader configured to capture at least a portion of heat emitted by the at least one electronic component and transfer at least a portion of the captured heat to the wrist band,
wherein the wrist band is configured to dissipate at least a portion of heat transferred by the heat spreader by radiating the at least a portion of the transferred heat through the at least a portion of the wrist band, the at least a portion of the wrist band configured with a first side comprising a transparent material and a second side comprising a non-transparent material.

5. The smart watch of claim 4, wherein the at least one surface comprises a surface of the at least one electronic component.

6. The smart watch of claim 4, wherein the heat spreader comprises a thermally conductive material.

7. The smart watch of claim 4, wherein the heat spreader comprises at least one of copper foil, aluminum foil, heat pipes, or carbon fibers.

8. The smart watch of claim 4, wherein the wrist band is further configured to dissipate the at least a portion of the heat transferred by the heat spreader by moving the at least a portion of the transferred heat from the wrist band to air through air movement around the wrist band.

9. The smart watch of claim 4, wherein the at least one electronic component comprises one of: a system on chip (SOC), a central processing unit (CPU), a graphics processing unit (GPU), a wireless communication chip, a printed circuit board (PCB), or an electromagnetic interference (EMI) shield.

10. A method of thermal management of a smart watch, comprising:
capturing at least a portion of heat emitted by one or more electronic components located within an enclosure;
transferring at least a portion of the captured heat to a wrist band outside the enclosure of the smart watch, wherein the wrist band is attached to the enclosure; and
dissipating at least a portion of the transferred heat through at least one surface of the wrist band, wherein the dissipating the at least a portion of the transferred heat comprises radiating the at least a portion of the transferred heat through at least a portion of the wrist band, the at least a portion of the wrist band configured with a first side comprising a transparent material and a second side comprising a non-transparent material.

11. The method of claim 10, wherein the capturing the at least a portion of emitted heat comprises being coupled to one or more surfaces within the enclosure with a portion of a thermally conductive path.

12. The method of claim 11, wherein the one or more surfaces comprise a surface of the one or more electronic components.

13. The method of claim 11, wherein the thermally conductive path comprises a thermally conductive material.

14. The method of claim 11, wherein the thermally conductive path comprises at least one of copper foil, aluminum foil, heat pipes, or carbon fibers.

15. The method of claim 11, wherein the transferring the at least a portion of the captured heat comprises providing the thermally conductive path between an interior of the enclosure and an interior of the wrist band.

16. The method of claim 10, wherein the dissipating the at least a portion of the transferred heat further comprises moving the at least a portion of the transferred heat from the wrist band to air through air movement around the wrist band.

17. An apparatus for thermal management, the apparatus being a smart watch, comprising:
means for capturing at least a portion of heat emitted by one or more electronic components located within an enclosure;
means for transferring at least a portion of the captured heat to a wrist band outside the enclosure of the smart watch, wherein the wrist band is attached to the enclosure; and
means for dissipating at least a portion of the transferred heat through at least one surface of the wrist band, wherein the means for dissipating the at least a portion of the transferred heat is configured to radiate the at least a portion of the transferred heat through at least a portion of the wrist band, wherein the at least a portion of the wrist band is made of a transparent material on a first side and a non-transparent material on a second side.

18. The apparatus of claim 17, wherein the means for capturing the at least a portion of emitted heat is configured to be coupled to one or more surfaces within the enclosure with a portion of a thermally conductive path.

19. The apparatus of claim 18, wherein the one or more surfaces comprise a surface of the one or more electronic components.

20. The apparatus of claim 18, wherein the thermally conductive path comprises a thermally conductive material.

21. The apparatus of claim 18, wherein the thermally conductive path comprises at least one of copper foil, aluminum foil, heat pipes, or carbon fibers.

22. The apparatus of claim 18, wherein the means for transferring the at least a portion of the captured heat comprises providing the thermally conductive path between an interior of the enclosure and an interior of the wrist band.

23. The apparatus of claim 17, wherein the means for dissipating the at least a portion of the transferred heat is further configured to move the at least a portion of the transferred heat from the wrist band to air through air movement around the wrist band.

* * * * *